(12) United States Patent
Trakhimovich

(10) Patent No.: US 9,766,113 B2
(45) Date of Patent: Sep. 19, 2017

(54) LOAD CELL DEVICE HAVING A FLEXURAL ARRANGEMENT

(71) Applicant: Shekel Scales Co. (2008) Ltd., Kibbutz Beit-Keshet (IL)

(72) Inventor: Michael Trakhimovich, Gan Ner (IL)

(73) Assignee: Shekel Scales Co. (2008) Ltd., Kibbutz Beit-Keshet (IL)

( * ) Notice: Subject to any disclaimer, the term of this patent is extended or adjusted under 35 U.S.C. 154(b) by 73 days.

(21) Appl. No.: 14/398,467

(22) PCT Filed: May 2, 2013

(86) PCT No.: PCT/IB2013/000821
§ 371 (c)(1),
(2) Date: Nov. 2, 2014

(87) PCT Pub. No.: WO2013/164675
PCT Pub. Date: Nov. 7, 2013

(65) Prior Publication Data
US 2015/0107913 A1 Apr. 23, 2015

(30) Foreign Application Priority Data
May 2, 2012 (GB) .................................. 1207656.8

(51) Int. Cl.
*G01G 3/14* (2006.01)
*G01G 23/06* (2006.01)
*G01G 21/22* (2006.01)

(52) U.S. Cl.
CPC ......... *G01G 3/1402* (2013.01); *G01G 3/1412* (2013.01); *G01G 21/22* (2013.01); *G01G 23/06* (2013.01)

(58) Field of Classification Search
CPC .... G01G 3/1402; G01G 3/1412; G01G 21/22; G01G 23/06
See application file for complete search history.

(56) References Cited

U.S. PATENT DOCUMENTS 4,107,985 A * 8/1978 Sommer ............... G01G 3/1412
177/211
4,332,174 A * 6/1982 Suzuki ................. G01G 3/1404
177/211
(Continued)

FOREIGN PATENT DOCUMENTS

FR 2660433 A 10/1991
GB 1207656.8 5/2012
(Continued)

OTHER PUBLICATIONS

International Search Report for PCT/IB2013/000821, search report mailed Sep. 3, 2013.
(Continued)

*Primary Examiner* — Natalie Huls
(74) *Attorney, Agent, or Firm* — Marc Van Dyke; Fourth Dimension IP

(57) ABSTRACT

A weighing scale and a load cell assembly therefor, the weighing scale including: (a) a weighing platform; (b) a base; and (c) a load cell arrangement including: (i) a load cell body, disposed below the platform and above the base, the body secured to the platform at a first position along a length of the body, and secured to the base at a second position along the length, the load cell body having a first cutout window transversely disposed through the body, the window adapted such that a downward force exerted on a top face of the weighing platform distorts the window to form a distorted window; and (ii) at least one strain-sensing gage, mounted on at least a first surface of the load cell body, the strain-sensing gage adapted to measure a strain in the first surface; and (d) an at least a one-dimensional flexure arrangement having at least a second cutout window transversely disposed through the body, the second cutout win-
(Continued)

dow shaped and positioned to at least partially absorb an impact delivered to a top surface of the load cell body.

19 Claims, 6 Drawing Sheets

(56) References Cited

U.S. PATENT DOCUMENTS

| | | | | |
|---|---|---|---|---|
| 4,546,838 A | * | 10/1985 | Ormond | G01G 3/1402 177/211 |
| 4,593,778 A | | 6/1986 | Konishi | |
| 4,700,656 A | * | 10/1987 | Cone | G01G 19/415 177/211 |
| 4,836,036 A | | 6/1989 | Jetter | |
| 5,154,247 A | | 10/1992 | Nishimura et al. | |
| 5,228,527 A | * | 7/1993 | Kroll | G01G 3/1402 177/211 |
| 5,391,844 A | * | 2/1995 | Johnson | G01G 3/1412 177/210 FP |
| RE35,301 E | * | 7/1996 | Reichow | G01G 19/12 177/136 |
| 5,604,336 A | * | 2/1997 | Johnson | G01G 3/1412 177/229 |
| 5,750,937 A | * | 5/1998 | Johnson | G01G 23/3707 177/199 |
| 5,894,112 A | * | 4/1999 | Kroll | G01G 19/07 177/134 |
| 6,633,008 B2 | * | 10/2003 | Johnson | G01G 23/06 177/184 |
| 2003/0111277 A1 | * | 6/2003 | Aumard | G01G 3/1412 177/229 |
| 2003/0131672 A1 | * | 7/2003 | Norling | G01L 1/127 73/862.627 |
| 2014/0262552 A1 | * | 9/2014 | Santi | G01G 3/14 177/1 |

FOREIGN PATENT DOCUMENTS

| | | |
|---|---|---|
| JP | 56125628 A | 10/1981 |
| KR | 20090033856 A | 4/2009 |

OTHER PUBLICATIONS

Written Opinion for PCT/IB2013/000821, written opinion mailed Sep. 3, 2013.
JP 56125628 Machine Translation Abstract (by EPO and Google)—published Oct. 2, 1981 Kubota Ltd.
FR2660433 Machine Translation Abstract (by EPO and Google)—published Oct. 4, 1991 Valadier.
KR20090033856 Machine Translation Abstract (by EPO and Google)—published Apr. 6, 2009 Han Sang.

* cited by examiner

SECTION A-A      SECTION B-B

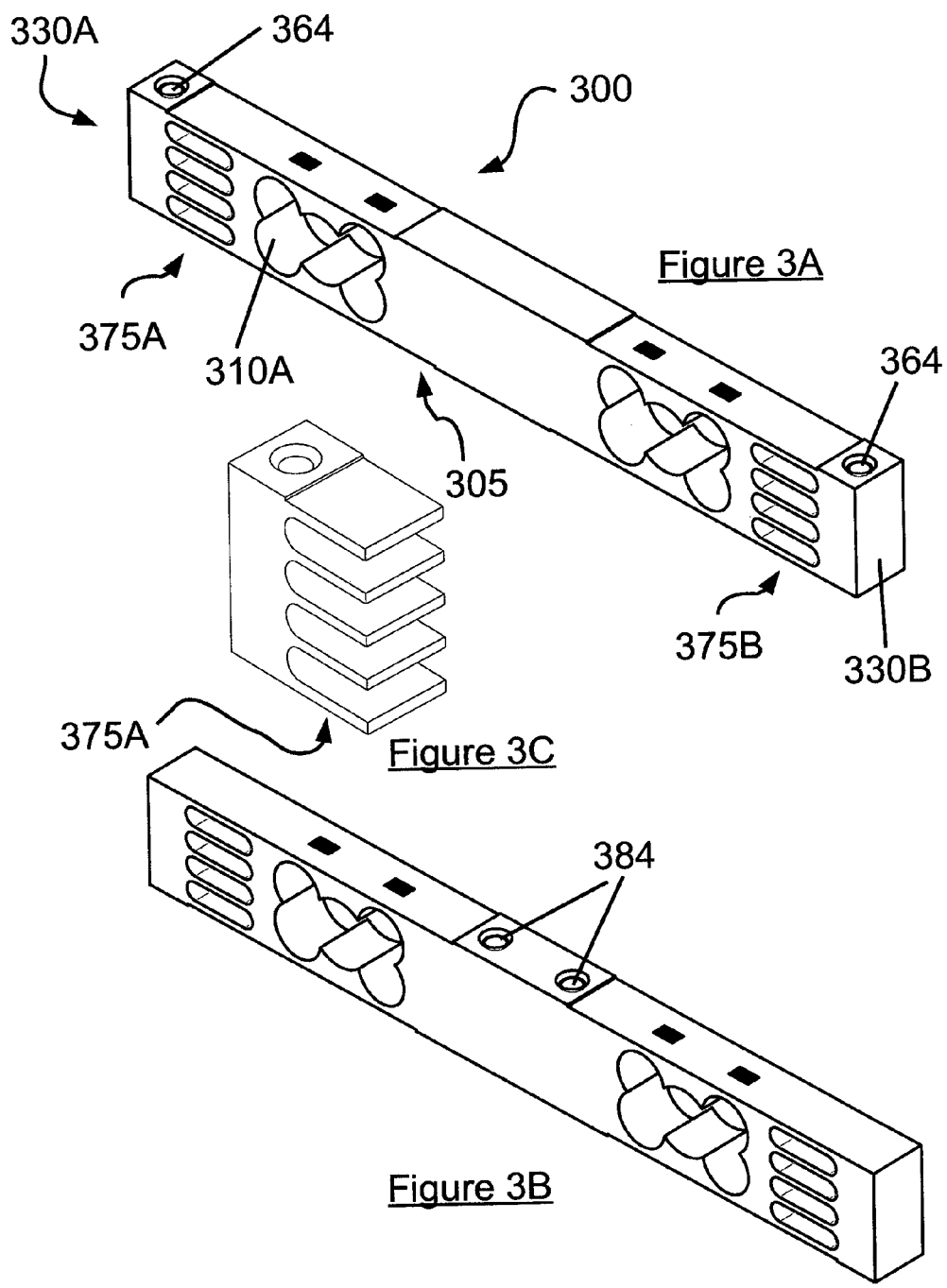

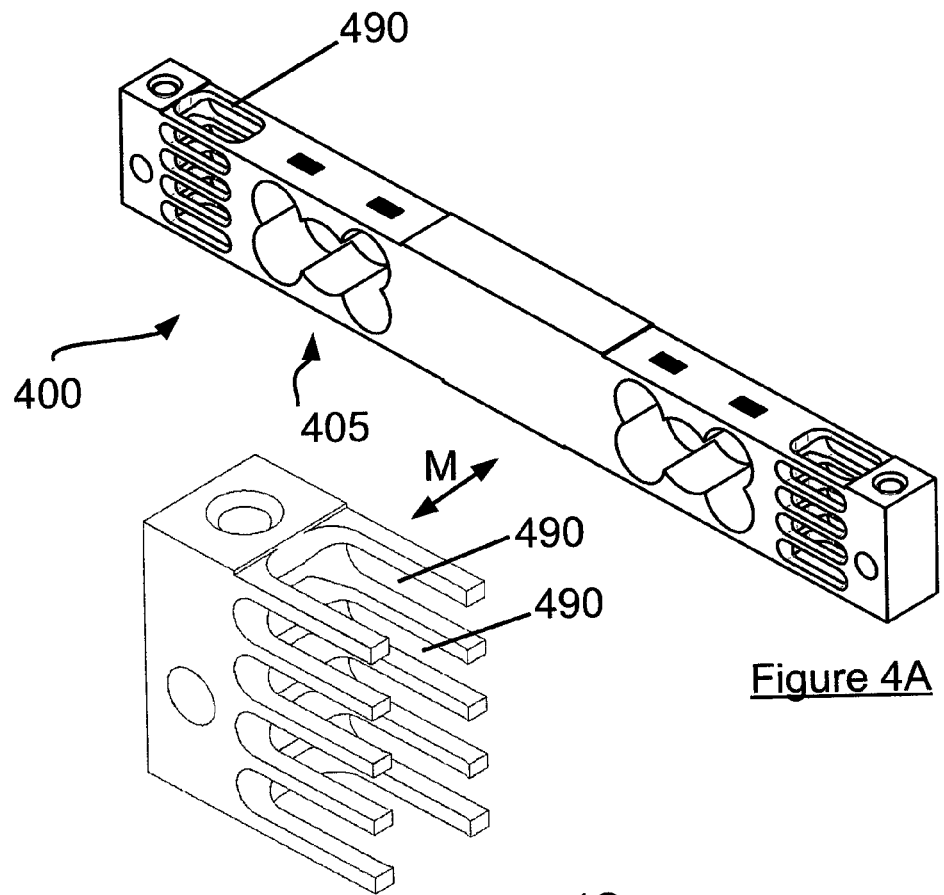
Figure 4A
Figure 4C
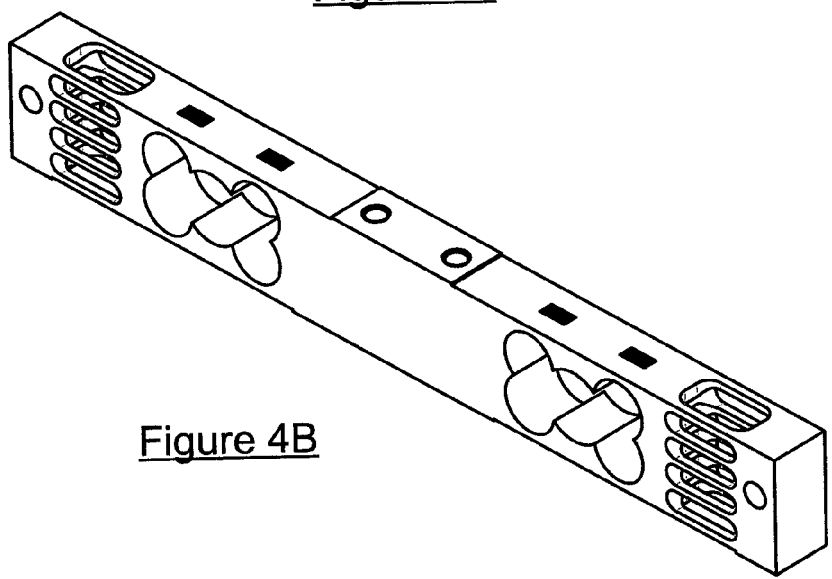
Figure 4B

LOAD CELL DEVICE HAVING A FLEXURAL ARRANGEMENT

CROSS-REFERENCE TO RELATED APPLICATIONS

This application draws priority from UK Patent Application Serial No. GB1207656.8, filed May 2, 2012, which is hereby incorporated by reference for all purposes as if fully set forth herein.

FIELD AND BACKGROUND OF THE INVENTION

The present invention relates to load cell assemblies and weighing devices employing such load cell assemblies, and more particularly, to impact-absorbent load cell assemblies and weighing devices that are largely impervious to shock forces acting thereupon.

Load cells are employed extensively in weighing scales because of their accuracy in measuring weights. Such load cells, or transducers, may have a metallic body having a generally rectangular perimeter. Opposing surfaces of the perimeter may carry surface-mounted, resistor strain gauges, interconnected to form an electrical bridge. The central portion of the body may have a rigidly-designed opening beneath the strain gauges to define a desired bending curve in the body of the load cell. The body of the load cell is adapted and disposed to provide cantilevered support for the weighing platform. Thus, when a weight is applied to the weighing platform, temporary deformations in the load cell body are translated into electrical signals that are accurately and reproducibly responsive to the weight.

When the weight on the platform is removed, the metallic load cell body is designed to return to an original, unstressed condition. However, excessive shock forces applied to the body via the weighing platform may permanently distort the load cell body, compromising thereby the accuracy of the bridge-circuit strain gauges.

SUMMARY OF THE INVENTION

According to teachings of the present invention there is provided a weighing scale including: (a) a weighing platform; (b) a base; and (c) a load cell arrangement including: (i) a load cell body, disposed below the platform and above the base, the body secured to the platform at a first position along a length of the body, and secured to the base at a second position along the length, the load cell body having a first cutout window transversely disposed through the body, the window adapted such that a downward force exerted on a top face of the weighing platform distorts the window to form a distorted window; and (ii) at least one strain-sensing gage, mounted on at least a first surface of the load cell body, the strain-sensing gage adapted to measure a strain in the first surface; and (d) an at least a one-dimensional flexure arrangement having at least a second cutout window transversely disposed through the body, the second cutout window shaped and positioned to at least partially absorb an impact delivered to a top surface of the load cell body.

According to further teachings of the present invention there is provided a load cell assembly, including: (a) a load cell arrangement including: (i) a load cell body having a first cutout window transversely disposed through the body, the window adapted such that a downward force exerted on a top face of the load cell body distorts the window to form a distorted window; and (ii) at least one strain-sensing gage, mounted on at least a first surface of the load cell body, the strain-sensing gage adapted to measure a strain in the first surface; and (b) an at least a one-dimensional flexure arrangement having at least a second cutout window transversely disposed through the body, the second cutout window shaped and positioned to at least partially absorb an impact delivered to a top surface of the load cell body.

According to still further features in the described preferred embodiments, the load cell body is adapted and disposed to provide cantilevered support for the weighing platform.

According to still further features in the described preferred embodiments, the at least one strain sensing gage is adapted to measure the strain at a location in the first surface that is above and/or below the distorted window.

According to still further features in the described preferred embodiments, the first cutout window and the load cell body are adapted such that, when a weight is disposed on the platform, bending beams in a vicinity of the first cutout window achieve a substantially double bending position.

According to still further features in the described preferred embodiments, the second cutout window is laterally disposed with respect to the first cutout window.

According to still further features in the described preferred embodiments, the first cutout window and the flexure arrangement are dimensioned to satisfy an equation:

$$(H_1+H_2)/H_3 < 0.50,$$

wherein $H_3$ is a height of the first cutout window; $H_2$ is a height of a protrusion of the flexure arrangement below a bottom plane of the first cutout window, $H_2$ being $\geq 0$; and $H_1$ is a height of a protrusion of the flexure arrangement above a top plane of the first cutout window, $H_1$ being $\geq 0$.

According to still further features in the described preferred embodiments, $(H_1+H_2)/H_3$ is at most 0.40, at most 0.30, at most 0.25, at most 0.20, at most 0.10, or at most 0.05.

According to still further features in the described preferred embodiments, the first and second positions are longitudinally disposed at a distance of at least 20%, at least 30%, at least 40%, at least 50%, or at least 60% of a longitudinal length of the load cell body.

According to still further features in the described preferred embodiments, the second cutout window is disposed in a proximal side of the load cell body, with respect to a free end of the load cell body.

According to still further features in the described preferred embodiments, the second cutout window is shaped and disposed to inhibit, or at least mitigate, a permanent distortion of the load cell body, when the impact is severe.

According to still further features in the described preferred embodiments, the second cutout window includes a plurality of windows.

According to still further features in the described preferred embodiments, the second cutout window is disposed substantially parallel to the top surface and a bottom surface of the load cell body.

According to still further features in the described preferred embodiments, the weighing scale further includes a dampening arrangement associated with the flexure arrangement.

According to still further features in the described preferred embodiments, the dampening arrangement includes a vibration suppressing material filling the second cutout window.

According to still further features in the described preferred embodiments, the dampening arrangement is adapted and disposed to dampen an amplitude of an electrical signal associated with the strain in the first surface.

According to still further features in the described preferred embodiments, the dampening arrangement is adapted and disposed to dampen an amplitude of an electrical signal associated with the strain in the first surface, with respect to a strain produced by a load cell arrangement identical to the load cell arrangement, but being unconnected to the dampening arrangement.

According to still further features in the described preferred embodiments, the dampening arrangement is adapted and disposed to dampen an amplitude of an electrical signal associated with the strain in the first surface, while being further adapted to reduce a settling time associated with the impact.

According to still further features in the described preferred embodiments, the vibration suppressing material has a Shore A hardness below 85, below 80, below 75, or below 70.

According to still further features in the described preferred embodiments, the vibration suppressing material has a Shore A hardness in a range between 35 and 75, between 40 and 70, between 45 and 70, between 50 and 70, between 55 and 70, or between 55 and 65.

According to still further features in the described preferred embodiments, the vibration suppressing material has a Shore A hardness of at least 30, at least 35, at least 40, or at least 45.

According to still further features in the described preferred embodiments, the vibration suppressing material has a modulus of elasticity of at most $10 \cdot 10^9$ Pa, at most $7 \cdot 10^9$ Pa, at most $5 \cdot 10^9$ Pa, or at most $2 \cdot 10^9$ Pa.

According to still further features in the described preferred embodiments, the modulus of elasticity of the vibration suppressing material is at least $0.5 \cdot 10^6$ Pa, at least $1 \cdot 10^6$ Pa, at least $210^6$ Pa, at least $3 \cdot 10^6$ Pa, at least $5 \cdot 10^6$ Pa, or at least $8 \cdot 10^6$ Pa.

According to still further features in the described preferred embodiments, the vibration suppressing material has a modulus of elasticity within a range of $0.5 \cdot 10^6$ Pa to $10 \cdot 10^9$ Pa, $0.75 \cdot 10^6$ Pa to $10 \cdot 10^9$ Pa, $1 \cdot 10^6$ Pa to $10 \cdot 10^9$ Pa, $3 \cdot 10^6$ Pa to $10 \cdot 10^9$ Pa, $5 \cdot 10^6$ Pa to $5 \cdot 10^9$ Pa, or $1 \cdot 10^6$ Pa to $10 \cdot 10^6$ Pa.

According to still further features in the described preferred embodiments, the weighing scale is a scanner-type weighing scale.

According to still further features in the described preferred embodiments, the flexure arrangement is disposed, from an impact absorption standpoint, before, and in series with, the load cell arrangement, with respect to the impact delivered to the top of the load cell body.

According to still further features in the described preferred embodiments, the flexure arrangement is disposed, from an impact absorption standpoint, at least partially in parallel with the load cell arrangement, with respect to the impact delivered to the top surface of the load cell body.

According to still further features in the described preferred embodiments, the at least a one-dimensional flexure arrangement is a two-dimensional or an at least two-dimensional flexure arrangement.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings:

FIG. 3A is a perspective view showing a top and side of a double ended bending beam having an integral one-dimensional flexure;

FIG. 3B is a perspective view showing a bottom and side of the load cell assembly of FIG. 3A;

FIG. 3C is a perspective, partial, cut-open view of the load cell assembly of FIG. 3A, showing the integral one-dimensional flexure;

FIG. 4A is a perspective view showing a top and side of a double ended bending beam having an integral two-dimensional flexure;

FIG. 4B is a perspective view showing a bottom and side of the load cell assembly of FIG. 4A;

FIG. 4C is a perspective, partial, cut-open view of the load cell assembly of FIG. 4A, showing the integral two-dimensional flexure.

DESCRIPTION OF THE PREFERRED EMBODIMENTS

Figure 1A:
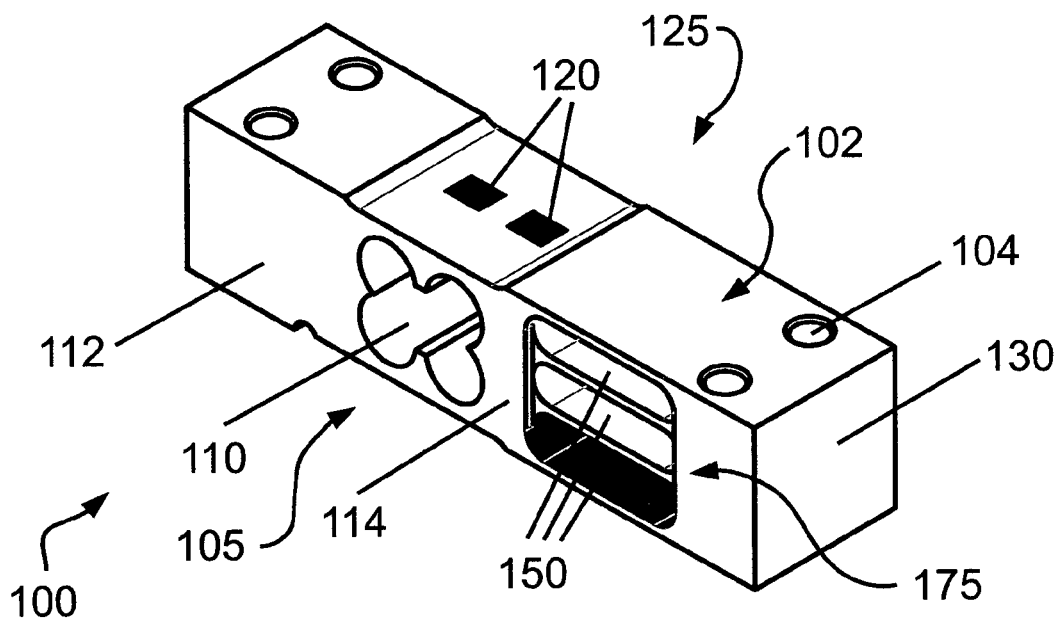
FIG. 1A is a simplified perspective view of an exemplary load cell assembly according to one embodiment of the present invention.

The principles and operation of the shock-absorbent load cell according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 1B:
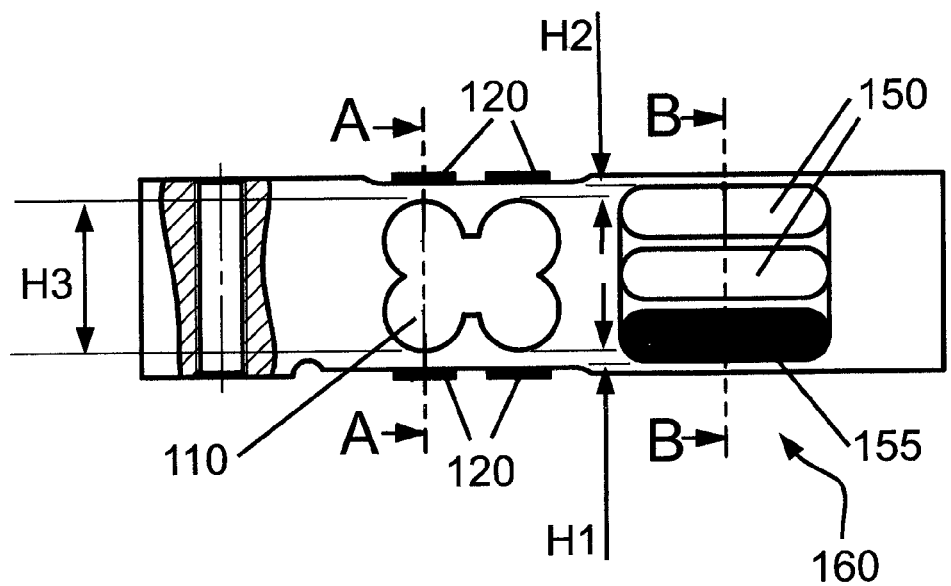
FIG. 1B is a schematic side view of the load cell assembly of FIG. 1A, with a partial cross-sectional view at the left end of the assembly.

Referring now to the drawings, FIG. 1A is a simplified perspective view of a load cell and flexure assembly 100 (also termed load cell assembly) according to one embodiment of the present invention. FIG. 1B provides a schematic side view of the load cell assembly of FIG. 1A, with a partial cross-sectional view at the left end of the assembly. Transverse cross-sectional views are provided in FIG. 1C (along the A-A line) and FIG. 1D (along the B-B line).

Figures 1C, 1D:
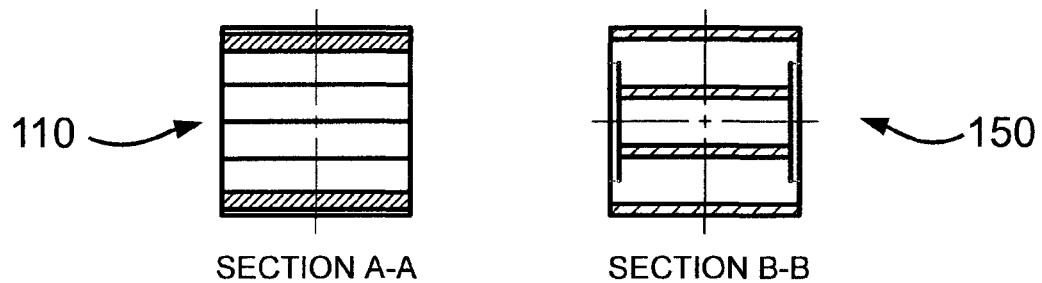
FIG. 1C is a transverse cross-sectional view of the load cell assembly of FIG. 1a, taken along the A-A plane shown in FIG. 1B.
FIG. 1D is a transverse cross-sectional view of the load cell assembly of FIG. 1A, taken along the B-B plane shown in FIG. 1B.
Figure 2:
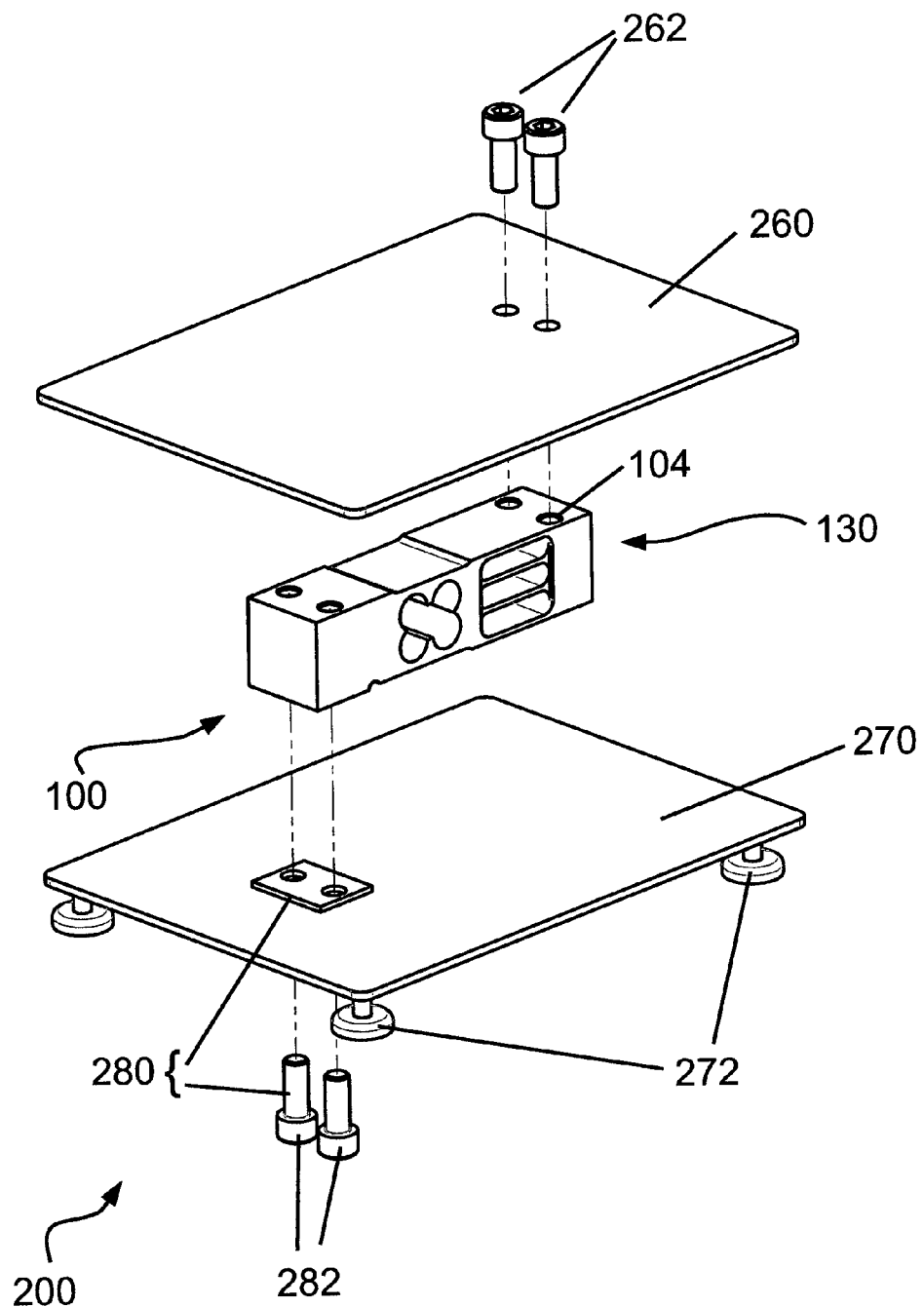
FIG. 2 is a schematic exemplary exploded view of a weighing module according to an embodiment of the present invention.

A load cell body 125 may be made from a block of load cell quality metal or alloy. Referring collectively to FIGS. 1A-1D, at least one transverse cutout 110 is formed in a side of the load cell body, to form bending beams above and below the cutout. These beams are held in fixed parallel relationship by end blocks 112, 114 on both ends of the load cell body. Load cell arrangement 105 may include strain-sensing gages 120 adapted and positioned to measure the strains caused by a force applied to the top of the (free side of) load cell body 125. When a vertical load acts on a free end (i.e., an end unsupported by the base, as shown in FIG. 2) 130 of load cell body 125, the load cell body undergoes a slight deflection or distortion, which distortion is measurably sensed by strain gages 120.

The load cell body may also have a hole, threaded hole, or receiving element (not shown) for receiving or connecting to a base or base element of the weighing system. Towards free end 130 of the load cell body, a top face 102 of the load cell body may have one or more hole, threaded hole, or receiving element 104 for receiving or connecting to a platform of the weighing system.

Load cell and flexure assembly 100 may also have at least one transverse cutout or "window" 150 formed in the side of the load cell body, in lateral position with respect to the transverse cutout(s) associated with the strain gages 120. In FIGS. 1A, 1B, and 1D are shown three such windows, disposed one on top of the other. The windows may be of a substantially rectangular profile. The ends of the windows may have a rounded or hemi-circular profile, substantially as shown.

Windows 150 may advantageously provide additional flexibility to the load cell body, and absorb excessive impact delivered to the body. Thus, windows 150 may form or partially form a flexure or shock-absorbing arrangement 175. Thus, flexure or shock-absorbing arrangement 175 is integral with load cell body 125 (e.g., both are disposed within a monolithic load cell body such as a monolithic block of alloy, aluminum metal, or aluminum-containing alloy suitable for use as a load cell body), within load cell and flexure assembly 100.

Windows 150 may be disposed in the proximal side of the load cell body, with respect to the free end 130 of the load cell body. In other words, windows 150 may be disposed longitudinally in-between transverse cutout 110 and free end 130.

In a preferred embodiment, shown in FIG. 1B, at least one of windows 150 may be filled, e.g., with an elastomer, to provide a dampening (vibration suppressing) mechanism 160 to load cell body 125. Typically, all of windows 150 may be filled with a vibration suppressing material. This mechanism is especially important when an excessive impact is delivered to the body. Silicone and rubber may be suitable materials for filling the windows.

The filling material may have a Shore A hardness below 80, and more typically, below 75, or below 70. The Shore A hardness may be at least 30, at least 35, at least 40, or at least 45. The Shore A hardness may be between 35 and 75, between 40 and 70, between 45 and 70, between 50 and 70, between 55 and 70, or between 55 and 65.

The filling material may have a modulus of elasticity that is less than half that of aluminum. More typically, the modulus of elasticity of the elastomer is less than $10 \cdot 10^9$ Pa, less than $7 \cdot 10^9$ Pa, less than $5 \cdot 10^9$ Pa, or less than $2 \cdot 10^9$ Pa. The modulus of elasticity may be at least $0.5 \cdot 10^6$ Pa, at least $1 \cdot 10^6$ Pa, at least $210^6$ Pa, at least $3 \cdot 10^6$ Pa, at least $5 \cdot 10^6$ Pa, or at least $8 \cdot 10^6$ Pa. The modulus of elasticity may be within the range of $0.5 \cdot 10^6$ Pa to $10 \cdot 10^9$ Pa, $0.75 \cdot 10^6$ Pa to $10 \cdot 10^9$ Pa, $1 \cdot 10^6$ Pa to $10 \cdot 10^9$ Pa, $3 \cdot 10^6$ Pa to $10 \cdot 10^9$ Pa, $5 \cdot 10^6$ Pa to $5 \cdot 10^9$ Pa, or $1 \cdot 10^6$ Pa to $10 \cdot 10^6$ Pa.

The filling material may advantageously contact an entire, or substantially entire, perimeter of window 150. The filling material may contain extremely small pockets of air. For example, the filler or filling material may have a sponge-like distribution of air pockets.

In one embodiment, the shock absorber arrangement is adapted whereby the arrangement maintains or nearly maintains the profile or "footprint" of the load cell assembly.

Referring back to FIG. 1B, the height of transverse cutout 110 is defined as $H_3$. The height of flexure arrangement 175 extending above the top of transverse cutout 110 is defined as $H_1$, and the height of flexure arrangement 175 extending below the bottom of transverse cutout 110 is defined as $H_2$. The minimum value of each of $H_1$ and $H_2$ is zero (i.e., $H_1$ and $H_2$ do not assume negative values).

The inventor has found that it may be highly advantageous for the heights $H_1$, $H_2$, and $H_3$ to satisfy the relationship:

$$(H_1+H_2)/H_3 < 0.50.$$

It may be of further advantage for $(H_1+H_2)/H_3$ to be less than 0.40, less than 0.30, less than 0.25, less than 0.20, less than 0.15, less than 0.10, or less than 0.05. In some cases it may be of further advantage for $(H_1+H_2)/H_3$ to be substantially zero.

This structural relationship may enable various low-profile scale modules, and may also enable facile retrofitting of the inventive load cell arrangement in existing weighing scales and weighing scale designs.

The inventive load cell assemblies may be particularly suitable for scanner-type weighing scales.

Figure 1E:
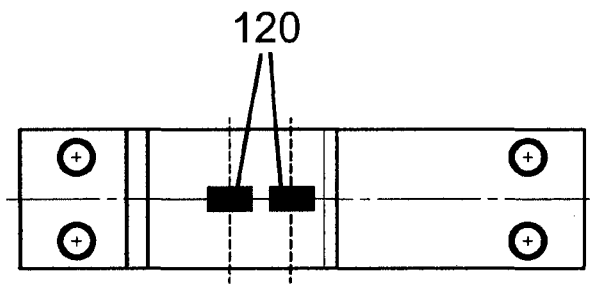
FIG. 1E is a schematic top view of the load cell assembly of FIG. 1A.

FIG. 1E provides a schematic top view of the load cell assembly of FIG. 1A, showing two strain sensing gages 120 disposed on a top surface of the load cell body.

Figure 1F:
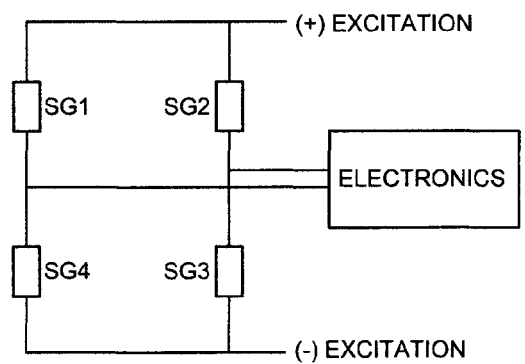
FIG. 1F is a conventional schematic diagram of the strain gage electronics.

FIG. 1F provides a conventional schematic diagram of the strain gage electronics, which may be used in, or with, the load cell assemblies and weighing modules of the present invention. The load cell system may further include a processing unit, such as a central processing unit (CPU). The processing unit may be configured to receive the load or strain signals (e.g., from 4 strain gages SG1-SG4) from each particular load cell and to produce a weight indication based on the load signals, as is known to those of ordinary skill in the art.

FIG. 2 is a schematic exemplary exploded view of a weighing module 200 according to an embodiment of the present invention. Weighing module 200 may include a load cell assembly such as load cell assembly 100, a weighing platform 260 disposed generally above load cell assembly 100, and a weighing module base 270 disposed generally below load cell assembly 100. Load cell assembly 100 may be secured to base 270 by means of an anchoring assembly 280, which may include at least one fastener such as screws 282. Base 270 may be equipped with a leg or more typically, a plurality of legs 272 adapted to make contact with a surface on which rests weighing module 200.

Load cell assembly 100 may be secured to weighing platform 260 by means of a securing arrangement 280, which may include at least one fastener such as screws 262, adapted to securely attach platform 260 to load cell assembly 100.

FIG. 3A is a perspective view showing a top and side of a double ended bending beam assembly 300 having integral, one-dimensional flexures 375A, 375B disposed near each longitudinal end 330A, 330B of beam 300. Flexure 375A, by way of example, may be disposed longitudinally between transverse cutout 310A associated therewith, and longitudinal end 330A.

FIG. 3B provides a perspective view showing a bottom and side of the load cell assembly of FIG. 3A. Referring collectively to FIGS. 3A and 3B, double ended bending beam assembly 300 may be secured within a weighing module in a largely analogous manner to that shown in FIG. 2, and described hereinabove. Double ended bending beam assembly 300 may be secured to a weighing module base by means of an anchoring assembly, which may include at least one fastener such as screws or complementary fasteners adapted to securely fit in at least one receptacle such as screwholes 384. Bending beam assembly 300 may be secured to a weighing platform (similar to weighing platform 260 shown in FIG. 2) by means of a platform securing arrangement, which may include at least one fastener or complementary fastener such as screws, adapted to securely attach the platform to beam assembly 300 by means of at least one receptacle such as screwholes 364.

In this embodiment, screwholes 364 are disposed towards the ends of beam assembly 300, with respect to each respective load cell, while screwholes 384 are disposed towards the center of beam assembly 300, with respect to each respective load cell.

FIG. 3C provides a perspective, partial, cut-open view of the load cell and flexure assembly of FIG. 3A, showing the integral one-dimensional flexure.

In the embodiment provided in FIGS. 3A-3C, beam assembly 300 may be adapted, when secured within a weighing module as described, such that a vertical impact (e.g., an object that is slammed down with great force onto the weighing platform) acts upon one-dimensional flexures 375A, 375B, while load cell arrangements 305 remain largely or substantially completely unaffected. Thus, flexures 375A, 375B may serve as a vertical shock-protection mechanism for the relatively delicate load cell arrangements 305. Flexures 375A, 375B may be designed and adapted to exhibit, at a maximum load capacity for the load cell, a vertical deflection that is at most 3 times, at most 2 times, at most 1.5 times, at most 1.0 times, or at most 0.8 times, the vertical deflection exhibited by the load cell itself (without the flexure), at that maximum capacity.

As described above, at least one of windows 150 may be filled, e.g., with an elastomer, to suppress vibration and reduce settling time. Typically, all of windows 150 may be filled with a vibration suppressing material.

FIG. 4A is a perspective view showing a top and side of a double ended bending beam having an integral two-dimensional flexure (the entire arrangement designated as assembly 400). FIG. 4B is a perspective view showing a bottom and side of assembly 400 of FIG. 4A. FIG. 4C is a perspective, partial, cut-open view of assembly 400 of FIG. 4A, showing the integral two-dimensional flexure.

Referring collectively to FIGS. 4A to 4C, the assembly 400 may be constructed, and may be adapted to operate in a substantially similar fashion to the double ended bending beam having an integral one-dimensional flexure described in detail hereinabove.

However, the second dimension of the integral two-dimensional flexure, including top-oriented windows 490, is adapted to serve as a horizontal shock-absorbing mechanism for the relatively delicate load cell arrangements 405. In the exemplary embodiment provided in FIGS. 4A to 4C, the second dimension of the integral two-dimensional flexure is particularly adapted to act on forces exerted in a direction M, generally perpendicular to the longitudinal or long dimension of assembly 400.

Figure 5:
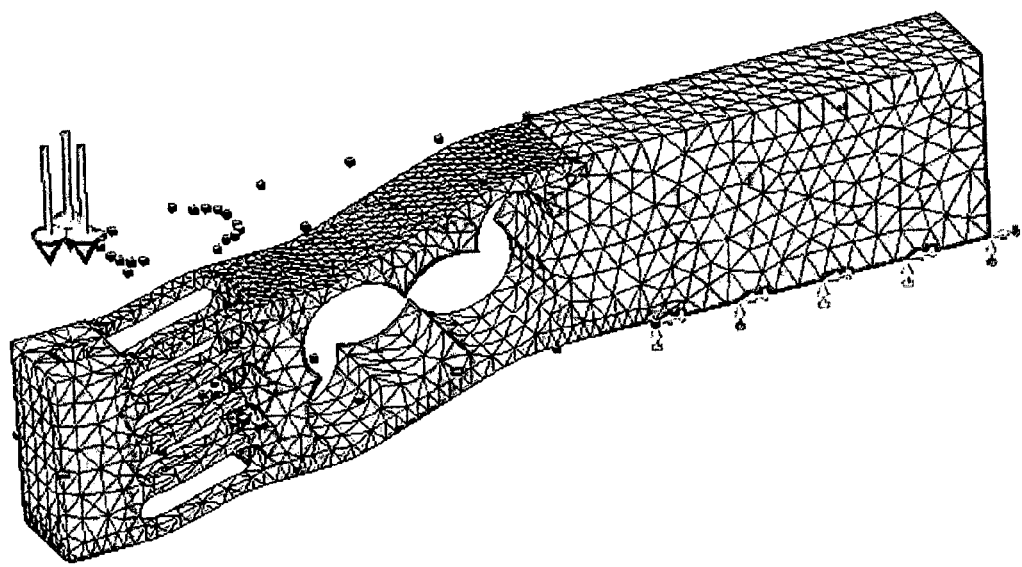
FIG. 5 is an exemplary static nodal stress plot showing the deflection of the flexure arrangement and the load cell arrangement in one embodiment of the load cell assembly of the present invention.

FIG. 5 is an exemplary static nodal stress plot showing the deflection of the flexure arrangement and the load cell arrangement in one embodiment of the load cell assembly of the present invention. It will be appreciated by those of skill in the art that the bending beams advantageously maintain a substantially double bending position.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:
1. A weighing scale comprising:
(a) a weighing platform;
(b) a base;
(c) a load cell arrangement including:
(i) a load cell body, disposed below said platform and above said base, said body secured to said platform at a first position along a long dimension of said body, and secured to said base at a second position along said long dimension, said load cell body having a first cutout window transversely disposed through said body, with respect to a top face of said weighing platform and to said long dimension, said window adapted such that a downward force exerted on said top face of said weighing platform distorts said window to form a distorted window; and
(ii) at least one strain-sensing gage, mounted on at least a first surface of said load cell body, said strain-sensing gage adapted to measure a strain in said first surface; and
(d) an at least a one-dimensional flexure arrangement having at least a second cutout window transversely disposed through said body, with respect to a top face of said weighing platform and to said long dimension, said second cutout window shaped and positioned to at least partially absorb an impact delivered to a top surface of said load cell body;
wherein, with said top face of said weighing platform facing upwards, said second cutout window includes a plurality of windows disposed one on top of the other;
said flexure arrangement disposed, from an impact absorption standpoint, before, and in series with, said load cell arrangement, with respect to said impact delivered to said top of said load cell body.

2. The weighing scale of claim 1, said load cell body adapted and disposed to provide cantilevered support for said weighing platform.

3. The weighing scale of claim 2, wherein said first cutout window and said load cell body are adapted such that, when a weight is disposed on said platform, bending beams in a vicinity of said first cutout window achieve a double bending position.

4. The weighing scale of claim 3, said second cutout window being laterally disposed with respect to said first cutout window.

5. The weighing scale of claim 2, said first cutout window and said flexure arrangement satisfying an equation:

$(H_1+H_2)/H_3<0.50$, wherein:
$H_3$ is a height of said first cutout window;
$H_2$ is a height of a protrusion of said flexure arrangement below a bottom plane of said first cutout window, $H_2$ being $\geq 0$; and
$H_1$ is a height of a protrusion of said flexure arrangement above a top plane of said first cutout window, $H_1$ being $\geq 0$.

6. The weighing scale of claim 5, wherein $(H_1+H_2)/H_3$ is at most 0.20.

7. The weighing scale of claim 6, the weighing scale being a scanner-type weighing scale.

8. The weighing scale of claim 1, said second cutout window being disposed in a proximal side of said load cell body, with respect to a free end of said load cell body.

9. The weighing scale of claim 1, wherein, with said top face of said weighing platform facing upwards, a top side of a top window of said plurality of windows is disposed substantially parallel to said top surface of said load cell body, along said long dimension of said load cell body, and a bottom side of a bottom window of said plurality of windows is disposed substantially parallel to a bottom surface of said load cell body, along said long dimension of said load cell body.

10. The weighing scale of claim 1, further comprising a dampening arrangement associated with said flexure arrangement, said dampening arrangement including a vibration suppressing material filling at least one of said plurality of windows, said dampening arrangement adapted and disposed to dampen an amplitude of an electrical signal associated with said strain in said first surface, with respect to a strain produced by a load cell arrangement identical to said load cell arrangement, but being unconnected to said dampening arrangement.

11. The weighing scale of claim 1, said at least a one-dimensional flexure arrangement being an at least two-dimensional flexure arrangement.

12. A weighing scale comprising:
(a) a weighing platform;
(b) a base;
(c) a load cell arrangement including:
(i) a load cell body, disposed below said platform and above said base, said body secured to said platform at a first position along a long dimension of said body, and secured to said base at a second position along said long dimension, said load cell body having a first cutout window transversely disposed through said body, with respect to a top face of said weighing platform and to said long dimension, said window adapted such that a downward force exerted on said top face of said weighing platform distorts said window to form a distorted window; and
(ii) at least one strain-sensing gage, mounted on at least a first surface of said load cell body, said strain-sensing gage adapted to measure a strain in said first surface; and
(d) an at least a one-dimensional flexure arrangement having at least a second cutout window transversely disposed through said body, with respect to a top face of said weighing platform and to said long dimension, said second cutout window shaped and positioned to at least partially absorb an impact delivered to a top surface of said load cell body;
said second cutout window being disposed in a proximal side of said load cell body, with respect to a free end of said load cell body;
wherein, with said top face of said weighing platform facing upwards, said second cutout window includes a plurality of windows disposed one on top of the other; said plurality of windows disposed substantially parallel to said top surface of said load cell body and to a bottom surface of said load cell body;
and wherein each of said plurality of windows has a rectangular profile.

13. The weighing scale of claim 12, wherein said rectangular profile is an elongated rectangular profile having a short side and a long side, and wherein said long side is disposed substantially parallel to said top surface and to said bottom surface of said load cell body.

14. The weighing scale of claim 12, wherein ends of each of said plurality of windows have a rounded profile.

15. The weighing scale of claim 12, wherein said an at least a one-dimensional flexure arrangement includes an additional cutout window disposed in said top surface of said load cell body.

16. The weighing scale of claim 12, wherein said an at least a one-dimensional flexure arrangement is a one-dimensional flexure arrangement.

17. The weighing scale of claim 12, wherein said an at least a one-dimensional flexure arrangement is a two-dimensional flexure arrangement.

18. A weighing scale comprising:
(a) a weighing platform;
(b) a base;
(c) a load cell arrangement including:
(i) a load cell body, disposed below said platform and above said base, said body secured to said platform at a first position along a long dimension of said body, and secured to said base at a second position along said long dimension, said load cell body having a first cutout window transversely disposed through said body, with respect to a top face of said weighing platform and to said long dimension, said window adapted such that a downward force exerted on said top face of said weighing platform distorts said window to form a distorted window; and
(ii) at least one strain-sensing gage, mounted on at least a first surface of said load cell body, said strain-sensing gage adapted to measure a strain in said first surface; and
(d) an at least a one-dimensional flexure arrangement having at least a second cutout window transversely disposed through said body, with respect to a top face of said weighing platform and to said long dimension, said second cutout window shaped and positioned to at least partially absorb an impact delivered to a top surface of said load cell body;

wherein said second cutout window includes a plurality of windows disposed one on top of the other;

wherein said plurality of windows is laterally disposed with respect to said first cutout window;

said plurality of windows being disposed in a proximal side of said load cell body, with respect to a free end of said load cell body;

and wherein, with said top face of said weighing platform facing upwards, each of said plurality of windows has an elongated rectangular profile, with a long dimension of said rectangular profile disposed along said long dimension of said load cell body.

19. The weighing scale of claim 18, wherein said first cutout window and said load cell body are adapted such that, when a weight is disposed on said platform, bending beams in a vicinity of said first cutout window achieve a double bending position.

\* \* \* \* \*